(12) United States Patent
Chen

(10) Patent No.: US 6,983,081 B2
(45) Date of Patent: Jan. 3, 2006

(54) METHOD FOR INTEGRATION OF SOURCE OBJECT INTO BASE IMAGE

(75) Inventor: Aubrey Kuang-Yu Chen, Taipei (TW)

(73) Assignee: Ulead Systems, Inc., Taipei (TW)

( * ) Notice: Subject to any disclaimer, the term of this patent is extended or adjusted under 35 U.S.C. 154(b) by 656 days.

(21) Appl. No.: 10/226,120

(22) Filed: Aug. 23, 2002

(65) Prior Publication Data

US 2004/0037476 A1     Feb. 26, 2004

(51) Int. Cl.
  *G06K 9/36*     (2006.01)
(52) U.S. Cl. .............. 382/284; 382/178; 345/629; 348/584
(58) Field of Classification Search ............. 382/284; 348/584
  See application file for complete search history.

(56) References Cited

U.S. PATENT DOCUMENTS

| | | | |
|---|---|---|---|
| 5,185,808 A * | 2/1993 | Cok | 382/284 |
| 5,768,412 A * | 6/1998 | Mitsuyama et al. | 382/173 |
| 5,870,103 A * | 2/1999 | Luo | 345/630 |
| 5,907,665 A * | 5/1999 | Sobol et al. | 358/1.9 |
| 6,370,442 B1 * | 4/2002 | Wang | 700/138 |
| 2003/0063797 A1 * | 4/2003 | Mao | 382/162 |

* cited by examiner

*Primary Examiner*—Bhavesh M. Mehta
*Assistant Examiner*—Manav Seth
(74) *Attorney, Agent, or Firm*—Birch, Stewart, Kolasch & Birch, LLP

(57) ABSTRACT

A method for integration of a source object into a base image. The method comprises the steps of identifying similar border pixels, calculating characteristic values of the similar border pixels in the source object and the base image, creating a tonal map using the characteristic values, segmentation filtering the source object and the overlapped area into regions, identifying similar regions in the source object, each of which, in the characteristic values, has a difference smaller than a second threshold from the similar border pixels in the source object and smaller than a third threshold from one region in the overlapped area having an average difference smaller than a fourth threshold from the similar border pixels in the overlapped area, and applying the tonal map to the similar regions.

12 Claims, 3 Drawing Sheets

METHOD FOR INTEGRATION OF SOURCE OBJECT INTO BASE IMAGE

BACKGROUND OF THE INVENTION

1. Field of the Invention

The present invention relates to a method for integration of a source object into a base image and particularly to a method for automatically detecting and adopting the color palette of the background region in the object/layer to the color palette of the background region in the base image.

2. Description of the Prior Art

As digital image capturing devices become cheaper and more popular, many PC users are interested in taking digital pictures and using a computer to make some changes to them for fun. In order to make it easy for general users to work on the images, many excellent tools are provided in image processing software applications. With these tools, it is possible to produce an artificially fabricated photo by integrating objects or image layers either cut out from a real photo or synthetically generated into another real photo or synthetically generated image used as a base image.

A seamless integration of the objects or image layers into the base image can make the fabricated photo look more real. Thus, the users expend much effort in blending them well. With tools provided in conventional image software applications, there are three approaches.

One is to apply a soft edge to the border pixels. The hue of the fabricated photo around the border between the object and the base image can be gradually shifted. However, this only reduces the sharpness of the edges locally without globally reducing or eliminating the color discontinuity between the object and the base image.

Another is to manually adjust color values using a color control tool. This requires considerable skill. Further, undesired color changes may be made to portions of the object.

The third is to isolate individual region in the object using a selection tool first and then adjust color values using the color control tool. This can avoid unwanted changes, however, it is difficult and time-consuming to identify the individual regions using the selection tool if the object contains numerous many-edged or gradient-based images such as clouds.

SUMMARY OF THE INVENTION

The object of the present invention is to provide a method for automatically detecting and adopting the color palette of the background region in the object/layer to the color palette of the background region in the base image.

The present invention provides a method for integration of a source object into a base image with an area overlapping the source object. The method comprises the steps of identifying similar border pixels, that is, pixels on two sides of a border between the source object and the base image having differences from each other smaller than a first threshold, calculating characteristic values of the similar border pixels in the source object and the base image using an energy function, creating a tonal map using the characteristic values, dividing the source object and the overlapped area in the base image into regions by segmentation filtering, identifying similar regions in the source object, each of which, in the characteristic values, has a difference smaller than a second threshold from the similar border pixels in the source object and has a difference smaller than a third threshold from one of the regions in the overlapped area having a difference smaller than a fourth threshold from the similar border pixels in the overlapped area, and applying the tonal map to the similar regions in the source object. The tonal value applied is subject to modification made by the energy distance between the source pixel and its corresponding pixel in the base image.

The present invention further provides a method for integration of a source object into a base image with an area overlapping the source object. The method comprises the steps of identifying groups of similar border pixels on two sides of a border between the source object and the base image, in each of the groups, the similar border pixels have differences from each other below a first threshold, calculating characteristic values of the similar border pixels in the source object and the base image using an energy function for each of the groups, creating a tonal map using the characteristic values for each of the groups, dividing the source object and the overlapped area in the base image into regions by segmentation filtering, identifying similar regions in the source object, each of which, in the characteristic values, has a difference smaller than a second threshold from a corresponding group of the similar border pixels in the source object and has a difference smaller than a third threshold from one of the regions in the overlapped area having a difference smaller than a fourth threshold from the corresponding group of the similar border pixels in the overlapped area, and applying to each of the similar regions in the source object one of the tonal maps created for the corresponding group of the similar border pixels.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
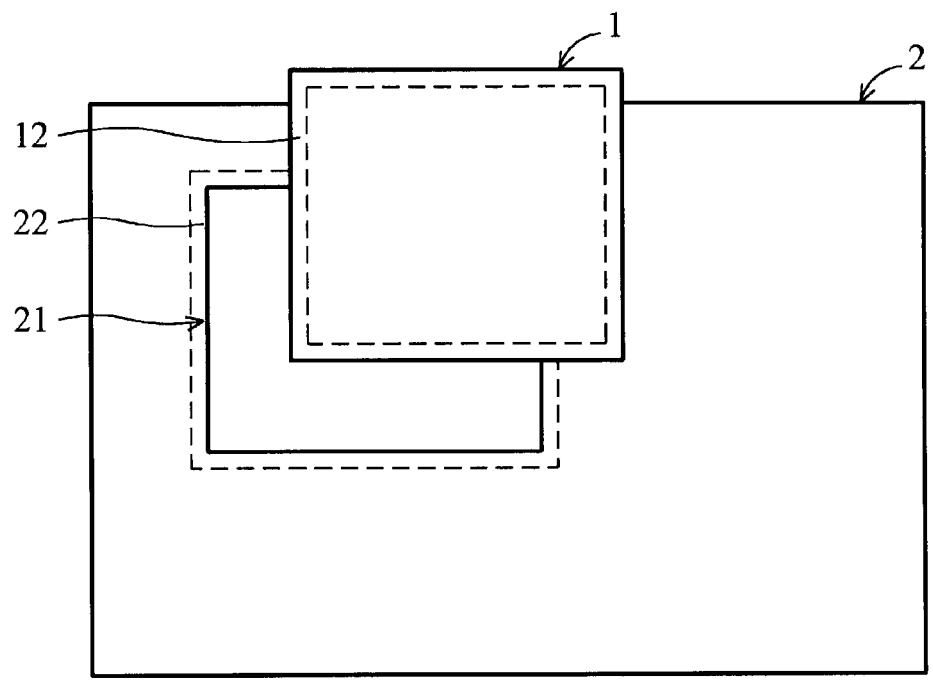
FIGS. 1~3 are diagrams showing the images processed by a method for integration of source object into base image according to one embodiment of the invention.
Figure 4:
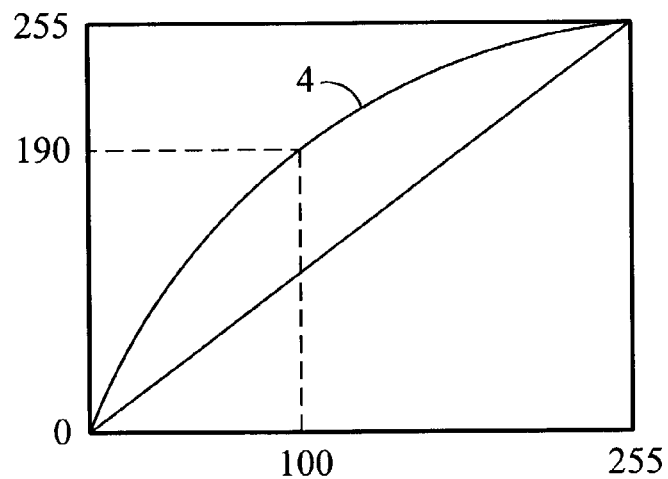
FIG. 4 is a diagram showing a tonal map created in a method for integration of source object into base image according to one embodiment of the invention.
Figure 5:
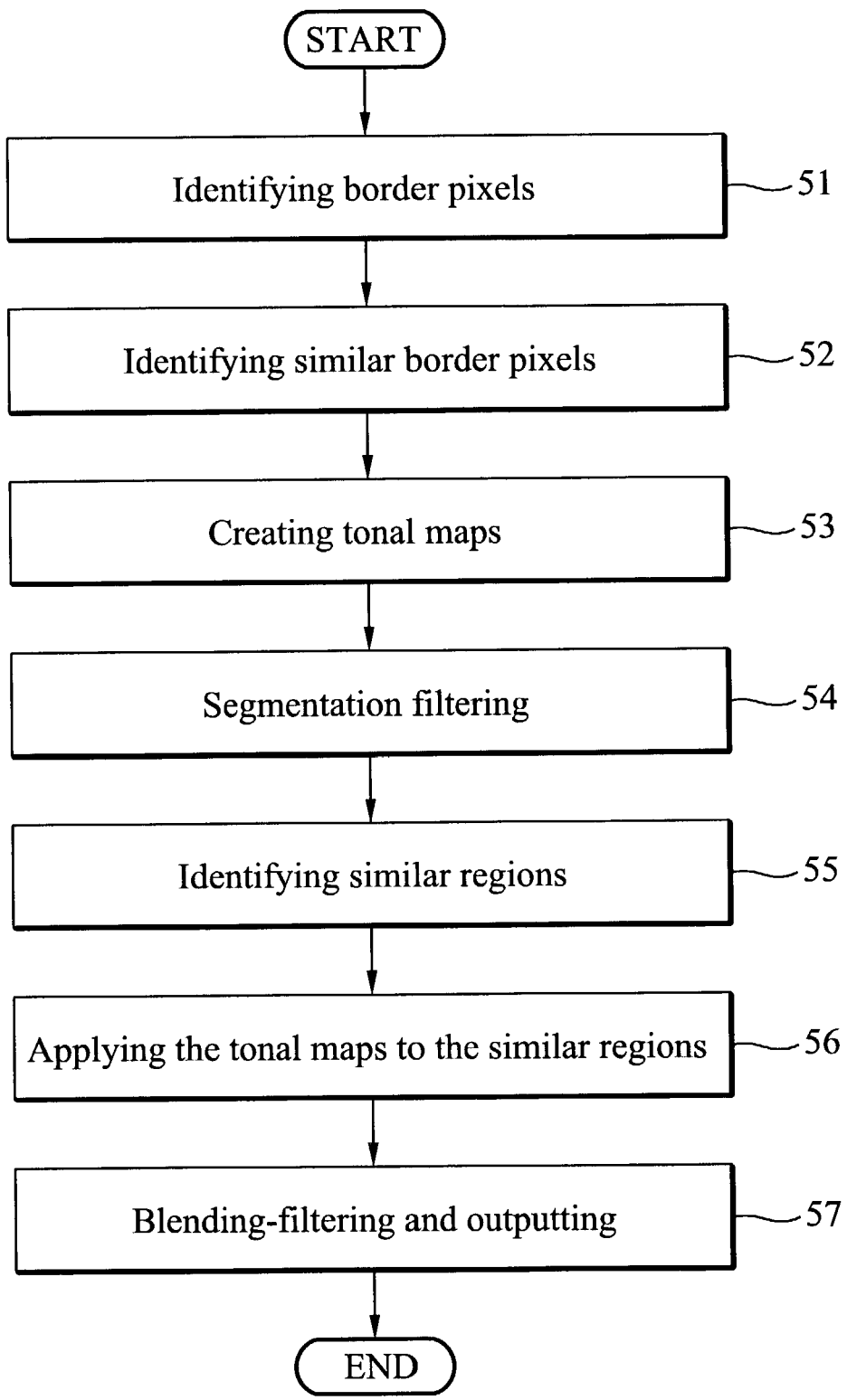
FIG. 5 is a flowchart of a method for integration of source object into base image according to one embodiment of the invention.

FIG. 5 is a flowchart of a method for integration of source object into base image according to one embodiment of the invention. The method will be explained by FIG. 5 accompanied with FIGS. 1~4. The method integrates a source object 1 into a base image 2 as shown in FIG. 1. The source object 1 overlaps an area 21 in the base image 2.

In step 51, pixels in two border regions 12 and 22 respectively in the source object 1 and base image 2 are identified as border pixels. The border regions 12 and 22 are respectively on two sides of a border 3 between the source object 1 and base image 2. The widths of the border regions 12 and 22 are determined under consideration of processing speed. The processing speed will be higher if the widths are smaller.

Figure 2:
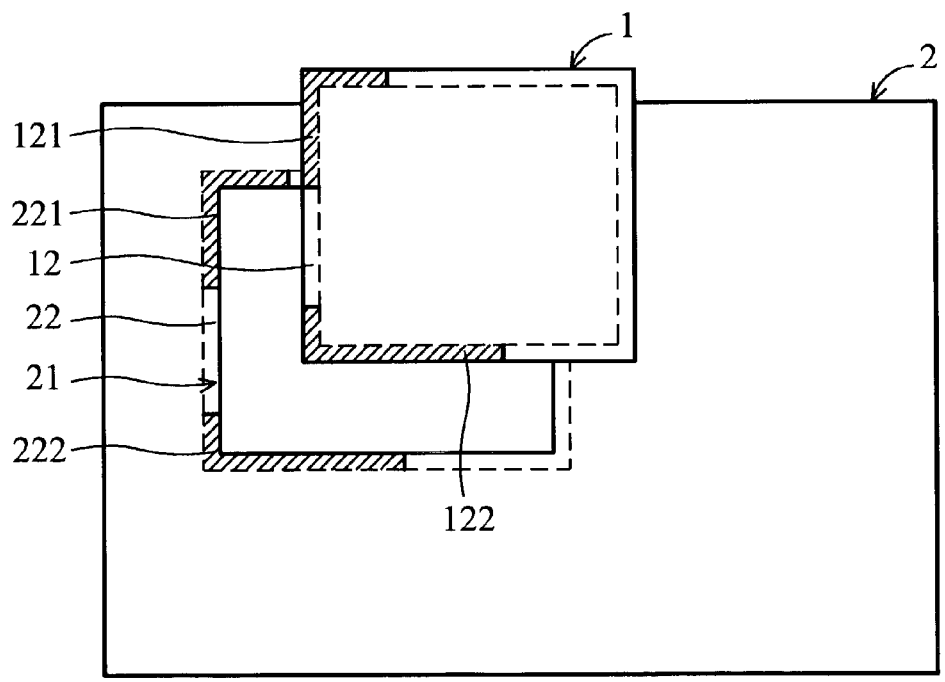
Figure 3:
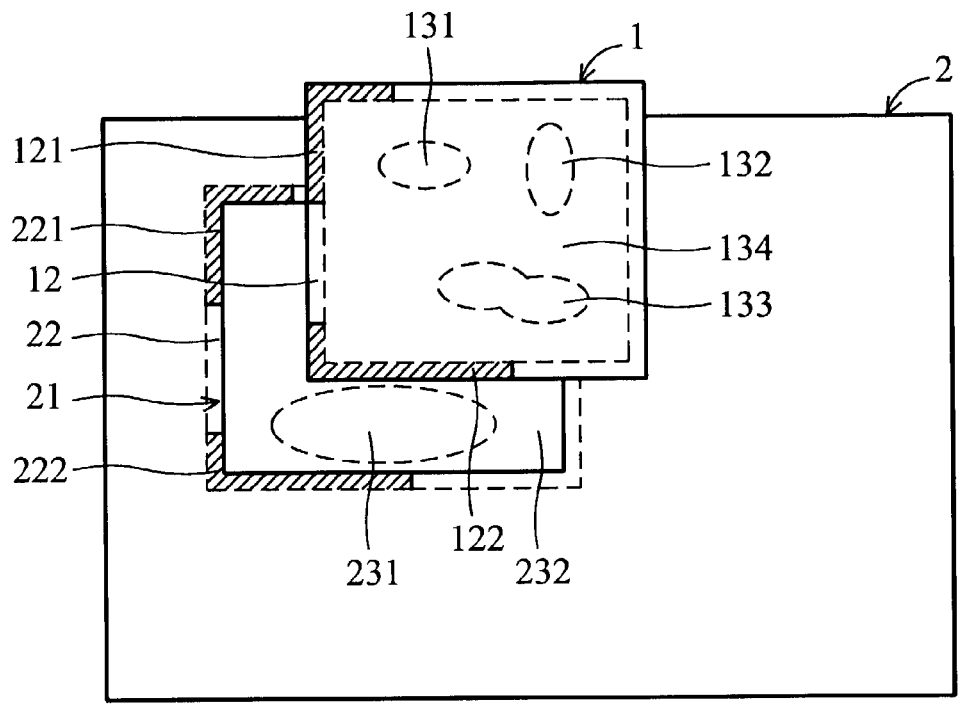

In step 52, the border pixels having differences from each other smaller than a given threshold are identified as a group of similar border pixels. As shown in FIG. 2, there are two groups of the similar border pixels. One group comprises the pixels in the sub-regions 221 and 121 respectively in the border regions 22 and 12. The other group comprises the pixels in the sub-regions 222 and 122 respectively in the border regions 22 and 12.

In step 53, a tonal map is created for each group of the similar border pixels. For each group of the similar border pixels, two characteristic values, such as averages of the pixels, respectively of the similar border pixels in the source object 1 and the base image 2 are calculated using an energy function. These two averages are given to a mapping function, such as a γ function, to create the corresponding tonal map. As shown in FIG. 4, for example, when the averages of the similar border pixels in the sub-regions 221 and 121 are 100 and 190 respectively, a tonal map represented by a curve 4 is created using the γ function.

In step 54, the source object 1 and the overlapped area 21 in the base image 2 are divided into segmented regions 131, 132, 133, 134, 231 and 232 by segmentation filtering.

In step 55, any one of the segmented regions 131, 132, 133 and 134 in the source object 1 satisfying three criteria as follows is identified as a similar region. The first is that, by average pixel value, the segmented region in the source object 1 has a difference smaller than a given threshold from one corresponding group of the similar border pixels in the source object 1 (the pixels in the sub-region 121 or 122). The second is that, by average pixel value, the segmented region in the source object 1 has a difference smaller than a given threshold from one of the segmented regions in the overlapped area 21. The third is that, by average pixel value, the segmented region in the overlapped area 21 mentioned in the second criterion has a difference smaller than a given threshold from the similar border pixels in the overlapped area 2 of the corresponding group mentioned in the first criterion(the pixels in the sub-region 221 or 222). For example, by average pixels, when the segmented region 132 has a difference smaller than a given threshold from the sub-region 121 and a difference smaller than a given threshold from the segmented region 232, and the segmented region 232 has a difference smaller than a given threshold from the sub-region 221, the segmented region 132 is identified as a similar region corresponding to the group of similar border pixels in the sub-regions 121 and 221.

In step 56, the tonal map created for the corresponding group is applied to the similar region. In the example of the step 55, the tonal map created for the group of similar border pixels in the sub-regions 121 and 221 is applied to the similar region 132.

In step 57, all the similar border pixels in the source object 1 and base image 2 are blended by blending-filtering. Finally, an image with seamless integration is produced.

In the previously described embodiment, the original pixel value, averages and differences may be color values in RGB, HSV or LAB format. A RGB/HSV/LAB color format transformation may be implemented if the format of the original pixel value is different from that used in calculating the averages and differences.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for integration of a source object into a base image with an area overlapping the source object, the method comprising the steps of:
   identifying similar border pixels, that is, pixels on two sides of a border between the source object and the base image having differences from each other smaller than a first threshold;
   calculating characteristic values of the similar border pixels in the source object and the base image using an energy function;
   creating a tonal map using the characteristic values;
   dividing the source object and the overlapped area in the base image into regions by segmentation filtering;
   identifying similar regions in the source object, each of which, in the characteristic values, has a difference smaller than a second threshold from the similar border pixels in the source object and has a difference smaller than a third threshold from one of the regions in the overlapped area having a difference smaller than a fourth threshold from the similar border pixels in the overlapped area; and
   applying the tonal map to the similar regions in the source object.

2. The method as claimed in claim 1 further comprising the step of:
   blending the similar border pixels in the source object and base image by blending-filtering.

3. The method as claimed in claim 1, wherein the differences and average pixels are calculated using RGB values of the pixels.

4. The method as claimed in claim 1, wherein the differences and average pixels are calculated using HSV values.

5. The method as claimed in claim 1, wherein the differences and average pixels are calculated using LAB values.

6. The method as claimed in claim 1, wherein the characteristic values are averages.

7. A method for integration of a source object into a base image with an area overlapping the source object, the method comprising the steps of:
   identifying groups of similar border pixels on two sides of a border between the source object and the base image, wherein, in each of the groups, the similar border pixels have differences from each other below a first threshold;
   calculating characteristic values of the similar border pixels in the source object and the base image using an energy function for each of the groups;
   creating a tonal map using the characteristic values for each of the groups;
   dividing the source object and the overlapped area in the base image into regions by segmentation filtering;
   identifying similar regions in the source object, each of which, in the characteristic values, has a difference smaller than a second threshold from a corresponding group of the similar border pixels in the source object and has a difference smaller than a third threshold from one of the regions in the overlapped area having a difference smaller than a fourth threshold from the corresponding group of the similar border pixels in the overlapped area; and
   applying to each of the similar regions in the source object one of the tonal maps created for the corresponding group of the similar border pixels.

8. The method as claimed in claim 7 further comprising the step of:
   blending the similar border pixels in the source object and base image by blending-filtering.

9. The method as claimed in claim 7, wherein the differences and average pixels are calculated using RGB values of the pixels.

10. The method as claimed in claim 7, wherein the differences and average pixels are calculated using HSV values.

11. The method as claimed in claim 7, wherein the differences and average pixels are calculated using LAB values.

12. The method as claimed in claim 7, wherein the characteristic values are averages.

* * * * *